United States Patent [19]

Seader

[11] 4,454,884
[45] Jun. 19, 1984

[54] WIDE DYNAMIC RANGE ULTRASOUND ECHO RECEIVER

[75] Inventor: Leonard D. Seader, Maple Valley, Wash.

[73] Assignee: Advanced Technology Laboratories, Inc., Bellevue, Wash.

[21] Appl. No.: 423,922

[22] Filed: Sep. 27, 1982

[51] Int. Cl.³ .................... A61B 10/00; G01N 29/00
[52] U.S. Cl. ................................. 128/660; 73/631; 73/632
[58] Field of Search .................... 128/660–663; 73/631, 632

[56] References Cited

U.S. PATENT DOCUMENTS 4,289,140  9/1981  Carpenter ............................ 73/631

Primary Examiner—Kyle L. Howell
Assistant Examiner—Deidre A. Foley
Attorney, Agent, or Firm—Lawrence S. Levinson; Sanford J. Asman

[57] ABSTRACT

The wide dynamic range ultrasound receiver utilizes a multi-stage logarithmic amplifier in order to logarithmically amplify a returned echo signal. The output of the returned echo signal from the logarithmic amplifier is simply added to a saw-tooth wave Time Gain Control (TGC) signal. Thus, the wide dynamic range of the returned echo signals is simply converted into a video display.

4 Claims, 6 Drawing Figures

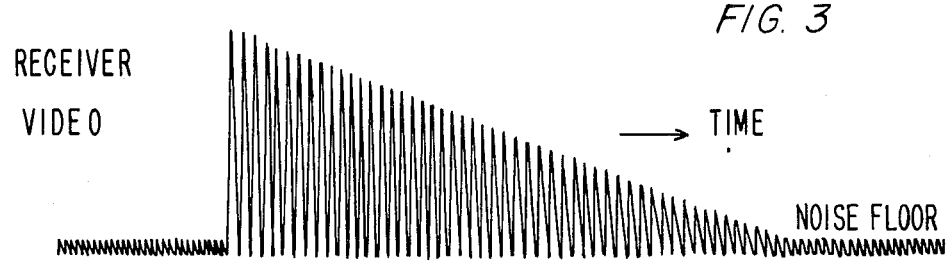
FIG. 3
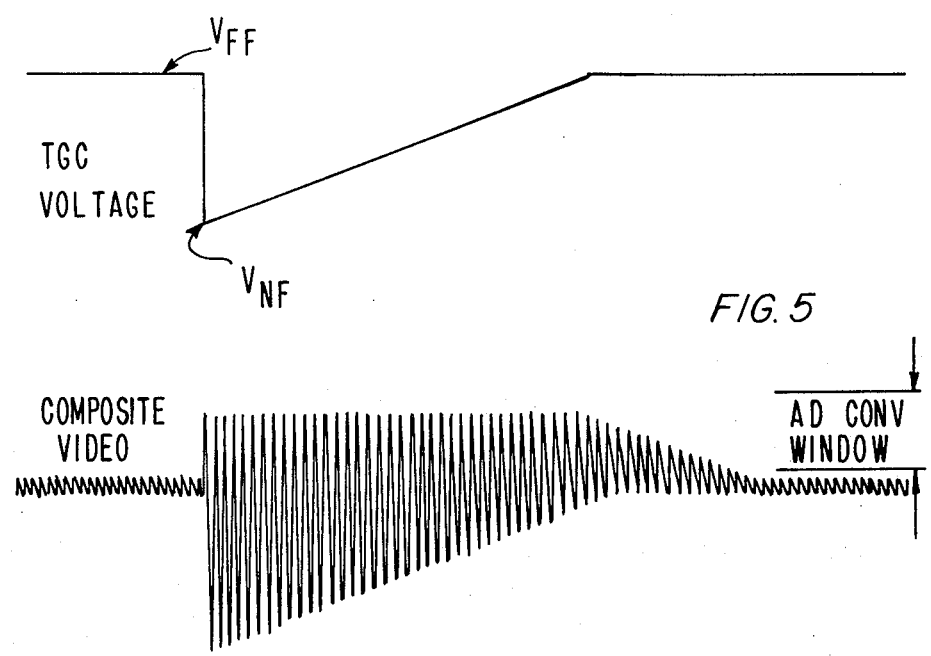
FIG. 4
FIG. 5

WIDE DYNAMIC RANGE ULTRASOUND ECHO RECEIVER

BACKGROUND OF THE INVENTION

The present invention relates to an ultrasound echo receiver of the type which is used in medical diagnostic devices.

Ultrasound is used in medical diagnostic equipment in order to perform non-invasive examinations of organs within a patient3 s body. Typically, an ultrasound pulse is transmitted into the patient3 s body, and an echo, representative of the location of a reflecting surface, is returned to the transducer. In view of the fact that the strength of reflected signals falls off exponentially as the distance between the ultrasound transducer and the reflecting surface increases, it is necessary to amplify the echo which is received from the reflecting surface within the diagnostic equipment.

Heretofore, a time-variable gain control (TGC) was used to regulate the RF gain of the ultrasound echos. TGC was used, because echos which are returned from surfaces farther from a transducer are weaker, and therefore require greater gain, than echos which are returned from surfaces closer to the transducer Problems with the prior art methods of regulating RF gain relate to the fact that it is difficult to eliminate the TGC control voltage from the resulting echo signal, the fact that there is relatively low response speed of RF gain changes to TGC signal changes, and the fact that it is complicated to control RF gain. Typical ultrasound diagnostic receivers use a cathode ray tube (CRT) to display images corresponding to the cross-section of the organs being scanned. The gray scale on a CRT monitor typically has a range of about 40 dB. That 40 dB range is used to represent the strength of received echos having a signal range which extends over approximately 110 dB.

In view of the problems with controlling RF gain in the receiver circuit, it would be desirable to have a circuit which is capable of controlling the gain of the input video signal to the CRT.

SUMMARY OF THE INVENTION

The present invention is a receiver for ultrasound medical diagnostic equipment which includes a series of fixed gain RF amplifiers, together with a logarithmic amplifier, preferably a monolithic, logarithmic amplifier. In the preferred embodiment, the logarithmic amplifier has four 30 dB log stages. The gain in each stage is such that output of each stage is proportional to the logarithm of the input voltage over the 30 dB input voltage range. The four stages are interconnected to obtain an input voltage range which is consistent with the return signal strength in the echo receiver, i.e. approximately 110 dB.

A receiver package having three RF amplifiers which are connected in series, will, accordingly, have four input voltages (corresponding to the input voltage of each of the three RF amplifiers and the output voltage of the final RF amplifier) to input into the four stages of the logarithmic amplifier.

The output of the logarithmic amplifier is further amplified and detected, and that output signal is used to provide an input video signal to the ultrasound unit's CRT display.

BRIEF DESCRIPTION OF THE DRAWING

In the drawing:

FIG. 3 is a graph of the type of signal which is received by the ultrasound echo receiver of the present invention;

FIG. 4 is a graph of the TGC signal used in the present invention;

FIG. 5 is a graph of the composite TGC signal of FIG. 4 combined with the return signal of FIG. 3 to provide the composite video signal.

DETAILED DESCRIPTION OF THE PREFERRED EMBODIMENT

Figure 1:
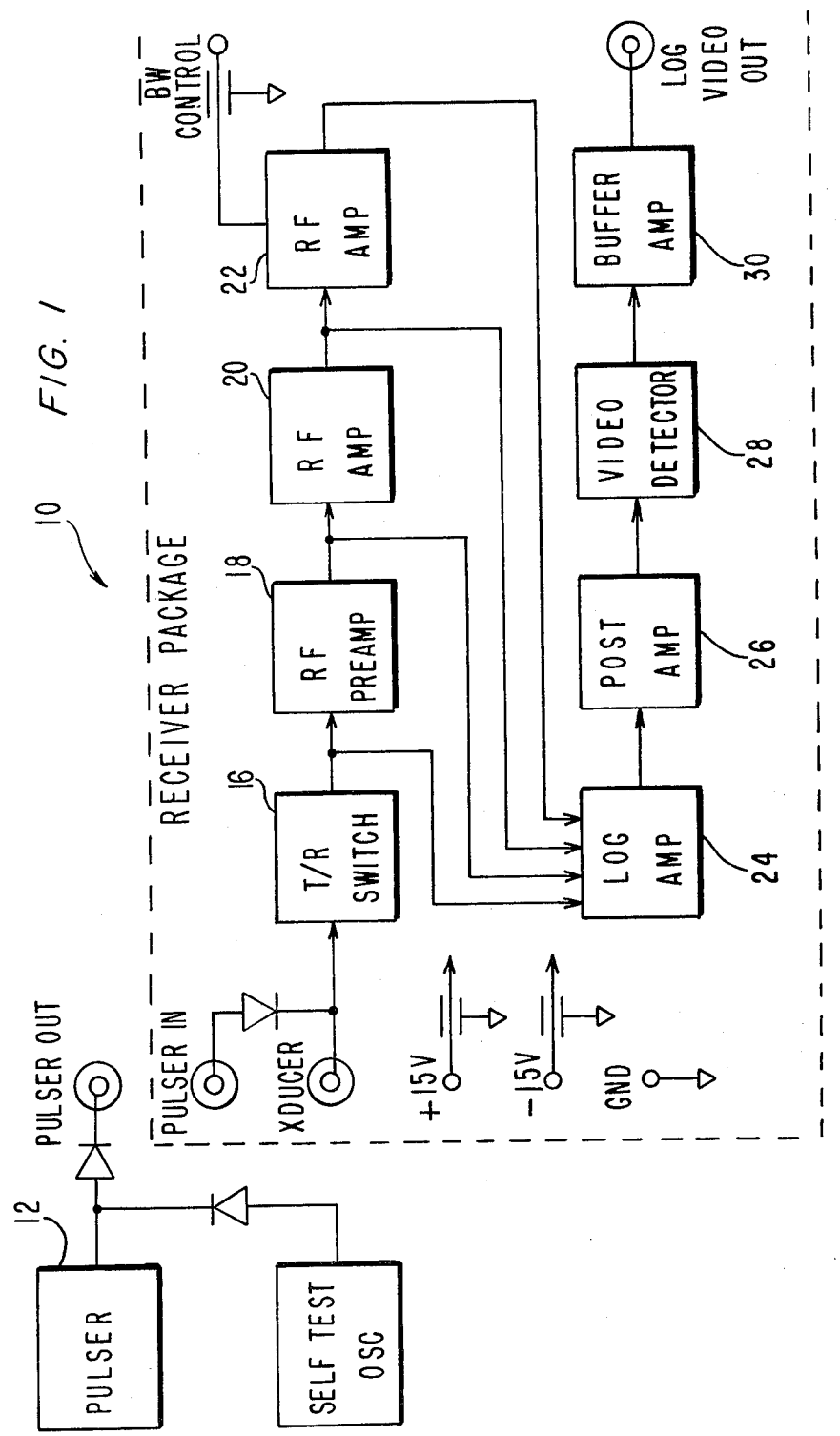
FIG. 1 is a block diagram of a portion of an ultrasound echo receiver which includes the present invention.

Referring generally to FIG. 1, a block diagram of a portion of an ultrasound echo receiver 10 is shown. The receiver 10 includes an ultrasound pulser 12, used to generate pulses of ultrasound energy, typically in the 1-10 MHz range. The pulser 10 sends pulses of ultrasonic energy to an ultrasound transducer (not shown) of the type typically used in medical diagnostic equipment. The ultrasound transducer may be a mechanical sector scanner, or it may be a transducer which uses either phased array or linear array technology. Pulses from the ultrasound pulser 12 are sent through diodes 14 into a transmit-receive switch 16. When the energy level into the transmit-receive switch 16 exceeds a predetermined value, the transmit-receive switch 16 opens, and the ultrasound energy from the pulser 12 goes into the ultrasound transducer. At all other times, the transmit-receive switch 16 is closed, and the ultrasound energy from the transducer is the input voltage to the receiver 10.

In addition to the transmit-receive switch 16, there are connected, in series, an RF pre-amplifier 18 and two RF amplifiers 20, 22. The input signal to the RF pre-amplifier 18, the input signals to the RF amplifiers 20, 22, and the output signal from the RF amplifier 22 are input signals to a multistage logarithmic amplifier 24, such as a Texas Instruments TL441C monolithic logarithmic amplifier.

The output signal from the logorithmic amplifier 24 is further amplified by an amplifier 26, and the output signal from the amplifier 26 is sent through a video detector 28 to a buffer amplifier 30.

Figure 2:
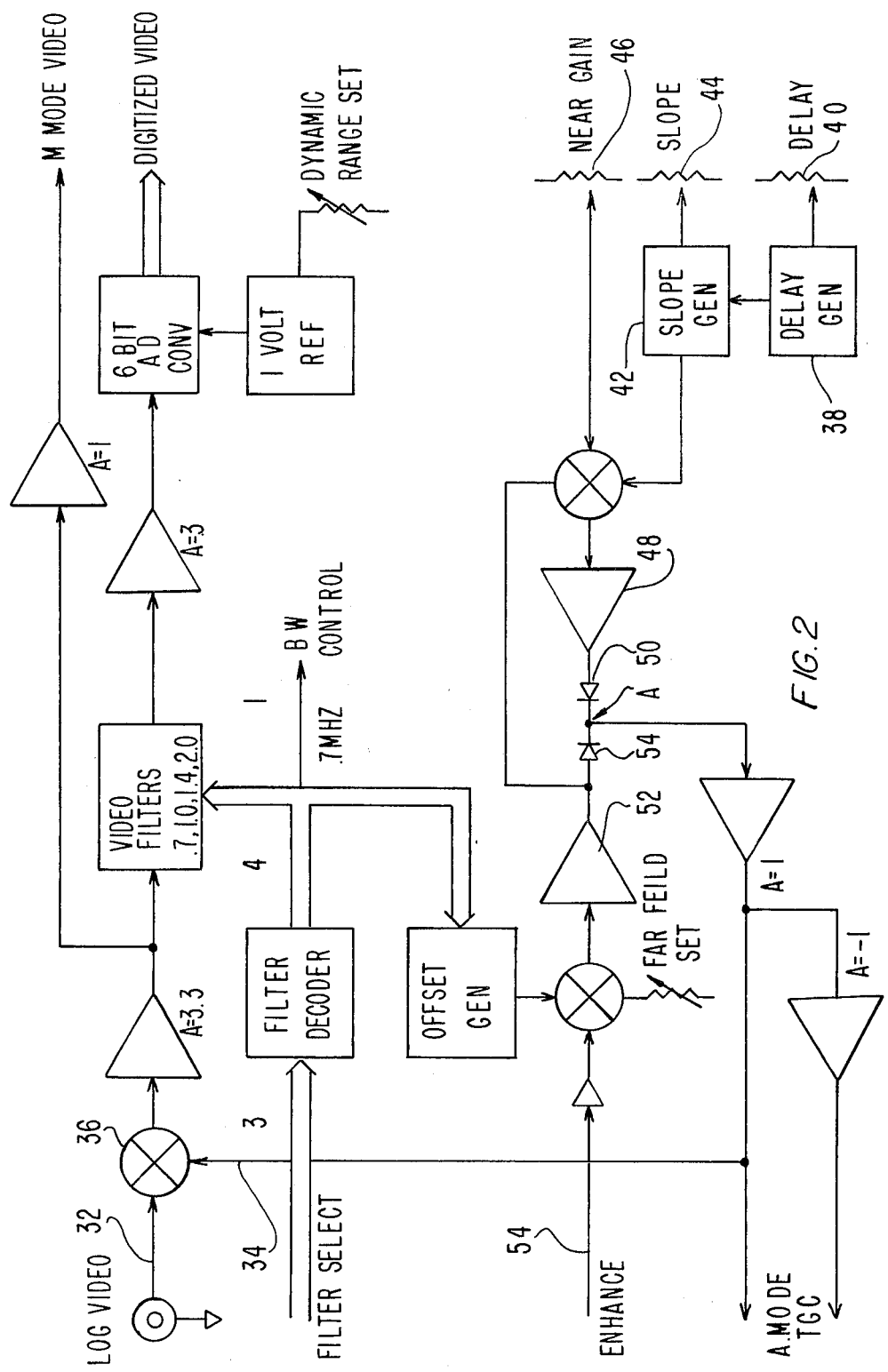
FIG. 2 is a block diagram of another portion of an ultrasound echo receiver including the present invention.

The output signal from the buffer amplifier 30, shown in FIG. 3, is essentially equal to the logarithm of the input signal from the transducer, i.e., the input to the RF amplifier 18. With reference to FIG. 2, that signal is on a first line 32.

A time gain control (TGC) signal on a second line 34 is added in an adder 36 to the log video signal which comes out of the receiver 10. The TGC signal has the form shown in FIG. 4. At the time the transmission occurs, a delay generator 38, set by a variable resistor 40, together with a slope generator 42, also set by a variable resistor 44, have combined outputs which are further combined at a summation point with the output of a variable resistor 46 which acts as the near gain control. These controls 40, 42, 46 establish the base gain of the overall receiver 10. The voltages are passed through a first operational amplifier 48 and diode 50 to point A. Similarly, voltages corresponding to a far field are sent through a second operational amplifier 52, i.e. the far field amplifier 52, through a second diode 54 to point A. The TGC waveform is limited so that it cannot go beyond the far field voltage, $V_{FF}$, as shown in FIG. 4.

Referring to FIG. 4, the TGC voltage drops rapidly from the far field voltage, $V_{FF}$, down to the near field voltage, $V_{NF}$ and then slopes back up to the far field voltage, $V_{FF}$, in the form of a saw-tooth wave.

The TGC signal of FIG. 4 is added to the log video signal coming out of the buffer amplifier 30 of the receiver 10 (shown in FIG. 3). At the end of the delay period during which the TGC signal is held at the near field level, $V_{NF}$, the TGC slope is generated by the slope generator 42 whose slope can be varied using the slope control resistor 44. At the time the pulse is transmitted by the transducer, the delay generator 38 is started. At the end of the delay period, during which the TGC signal is held at the far field level $V_{NF}$, the TGC slope is generated by the slope generator 42 whose slope can be varied using the slope control resistor 44. That is combined with the voltage from the near gain resistor 46 to set the base gain of the overall receiver.

With reference to FIG. 2, there are two signals going into point A. The voltage that comes from the far field amplifier 54 is established to negative limits and cannot go any lower than that. The TGC voltage drops to that lower limit. It starts out at the higher level set by the near gain control 46 and then it ramps back up to far field voltage. The slope that it uses is set by the slope control 44.

Addition of the log video signal on line 32 with the TGC voltage on line 34 results in the composite video signal, shown in FIG. 5. The composite video is amplified, filtered, attenuated, and applied to an Analog-to-Digital Converter. Digitized video is displayed on the CRT. Only that portion of the composite video signal which falls within the Analog-to-Digital window will be displayed. The linear addition of the TGC voltage to the log video signal effectively reduces the gain of the receiver when strong signals from nearby reflectors are received and increases the gain of the receiver when weak signals from distant reflectors are received, so that at all distances only the strongest 40 dB segment of the echos are displayed.

Figure 6A:
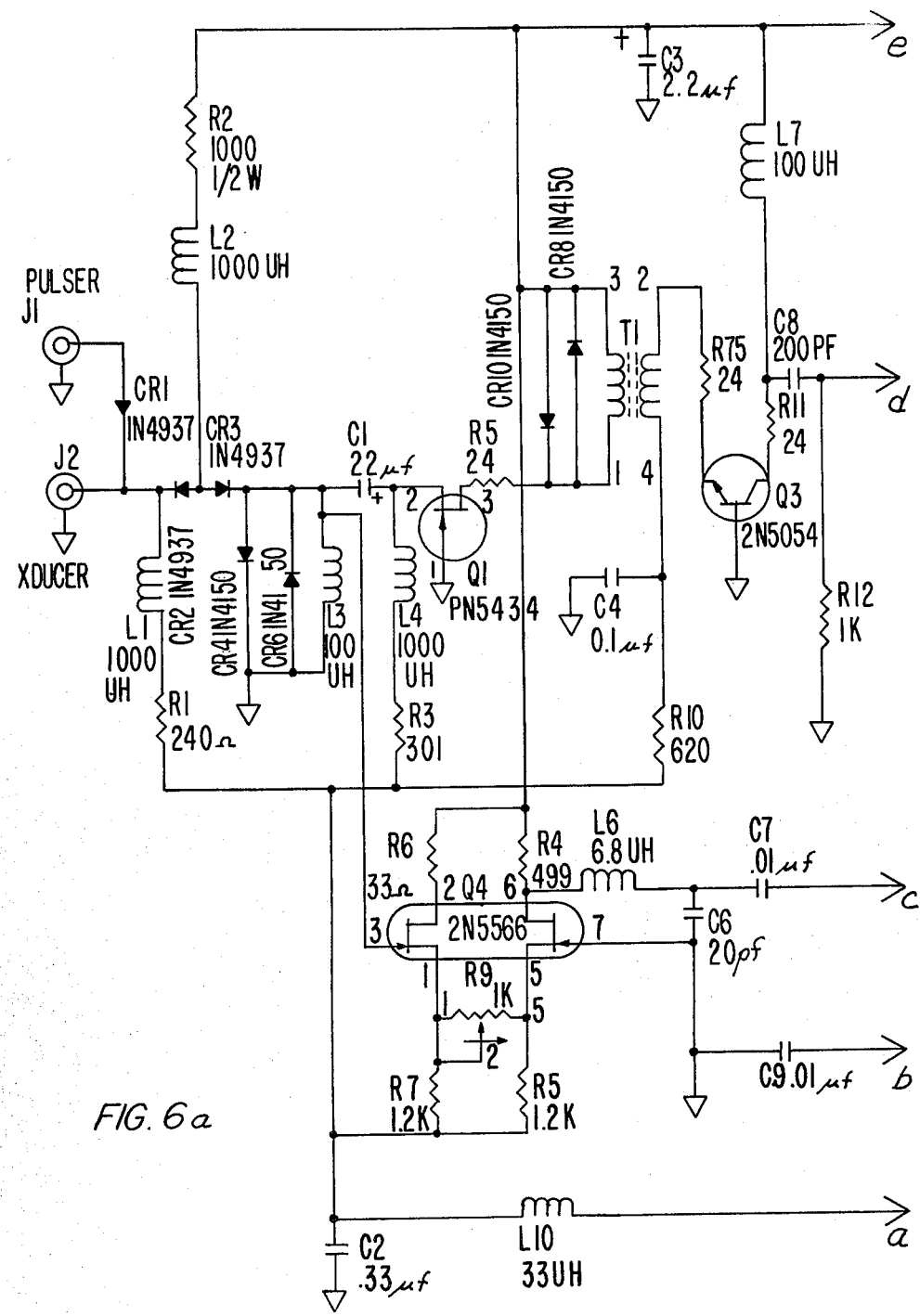
FIG. 6 is a detailed schematic diagram of the portion of the receiver illustrated in FIG. 1.
Figure 6:
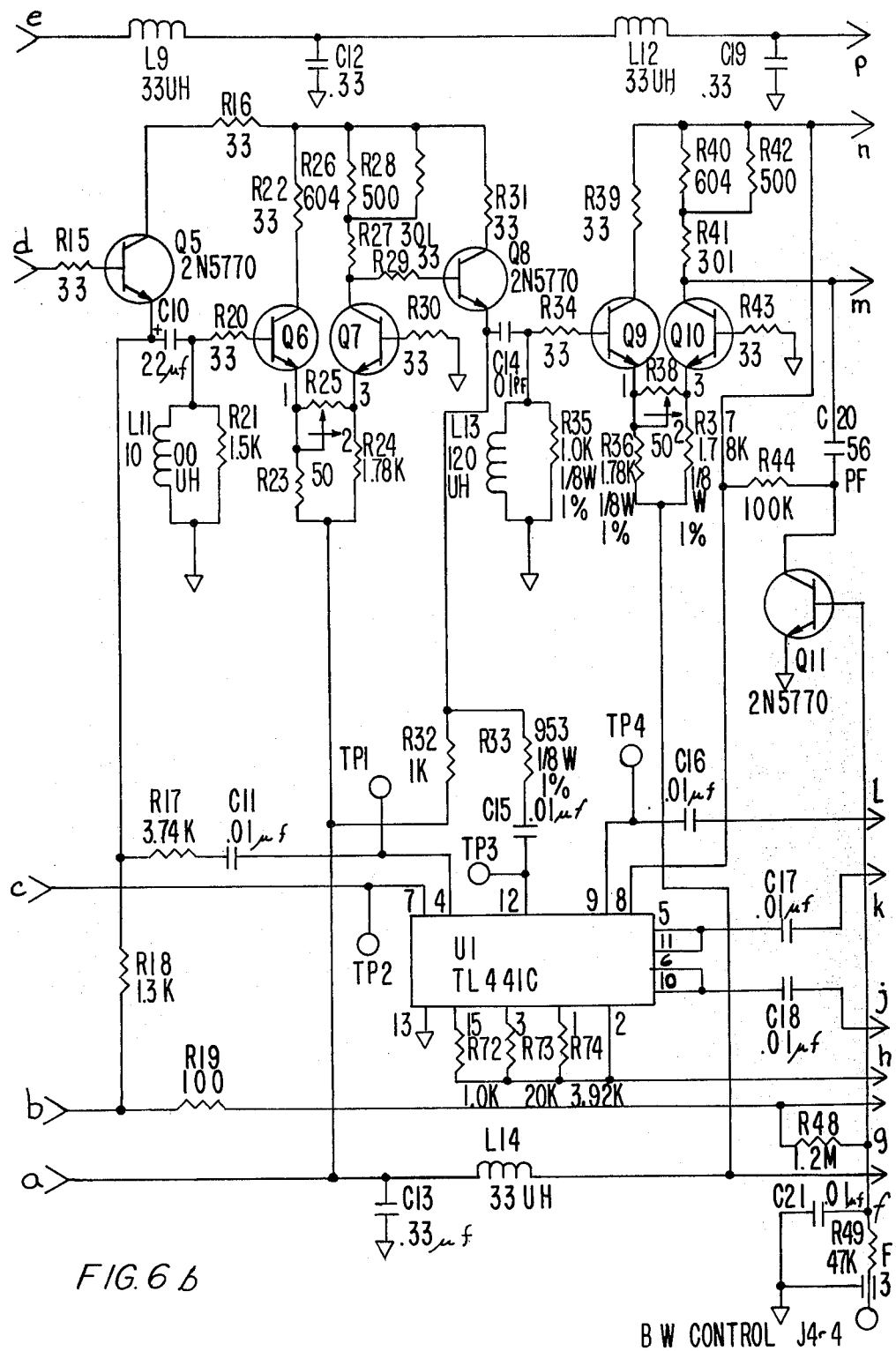
Figure 6C:
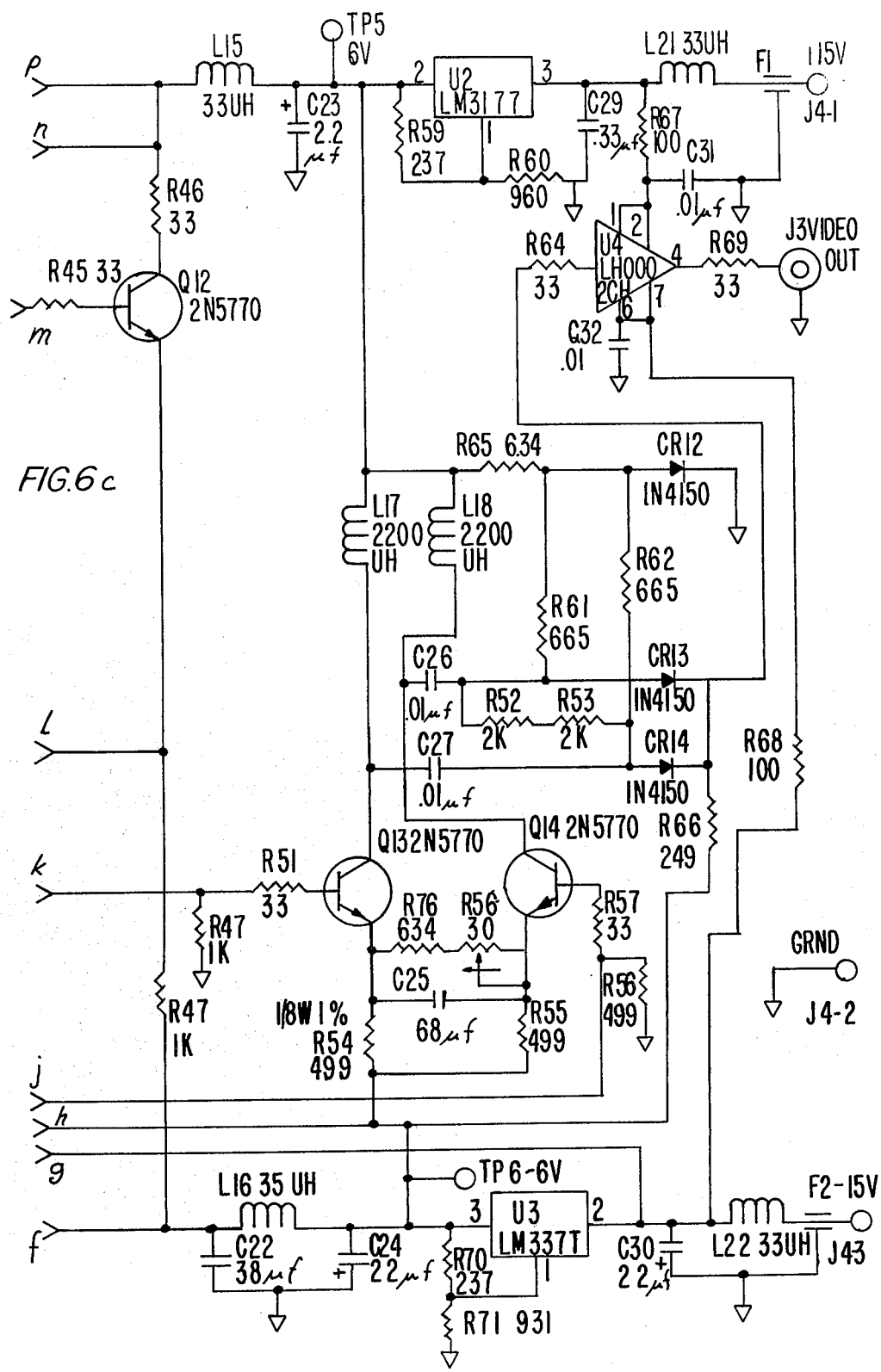

Referring now to FIG. 6, a detailed schematic diagram of the receiver circuit 10 is shown. The transmit-receive switch 16 (as shown in FIG. 1) is implemented by diodes CR1, CR2, CR3, CR4, and CR6. The RF pre-amplifier 18 is implemented by transistors Q1 and Q3 and associated components which are used for signal coupling. The RF amplifiers 20, 22 are comprised of a pair of substantially identical stages. The first stage is made up of transistors Q5, Q6, Q7, and Q8, together with associated resistors. Similarly, the second RF amplifier 20 is comprised of transistors Q9, Q10, Q11, Q12, and associated resistors.

The output of the RF preamplifier is passed through transistor Q5 which operates in the emitter follower mode, i.e. as a unity gain amplifier, into the monolithic logarithmic amplifier U1 via resistor R17. Similarly, the output of RF amplifier 20 is passed through resistor R33 into the monolithic logarithmic amplifier U1, and the output of RF amplifier 22 is passed into the logarithmic amplifier U1 via transistor Q12 operating in the emitter follower mode. The post amplifier 26 is comprised substantially of transistors Q13 and Q14 and their associated components.

In view of the detail shown in the schematic diagram of FIG. 6, and the fact that the operation of the circuit has heretofore been described with reference to FIG. 1, no additional description of the components or operation is required.

I claim:

1. A wide dynamic range ultrasound echo receiver comprising:
   (a) a first linear amplifier having an input and an output:
   (b) a multi-stage logarithmic amplifier having a first input associated with a first stage and at least one subsequent input associated with at least a second stage, said multi-stage logarithmic amplifier having a single output, whereby each stage has a gain such that the output of said stage is proportional to the logarithm of the input voltage to said stage and the output of said multi-stage logarithmic amplifier corresponds to the sum of the logarithms of the input voltages to the various stages;
   (c) means for introducing a voltage signal representative of a received ultrasound echo into the input of said first linear amplifier and into said first input associated with said first stage of said multi-stage logarithmic amplifier;
   (d) means for introducing the output of said first linear amplifier into said subsequent input of said second stage of said multi-stage logarithmic amplifier; and
   (e) means for generating and adding a sawtooth voltage signal to the output signal of said multi-stage logarithmic amplifier, whereby the composite signal thus formed will be representative of the subject matter being scanned by said received ultrasound echo.

2. The wide dynamic range ultrasound echo receiver of claim 1, further comprising video means coupled to the output of the multi-stage logarithmic amplifier for detecting a video signal from said composite output signal.

3. The wide dynamic range ultrasound echo receiver of claim 2 further comprising at least a second linear amplifier having an input and an output, the output of said first linear amplifier being the input to said second linear amplifier and said subsequent input into the second stage of said multistage logarithmic amplifier, the output of said second linear amplifier serving as said subsequent input to a third stage of said multistage logarithmic amplifier.

4. The wide dynamic range ultrasound echo receiver of claim 2 further comprising at least a third linear amplifier having an input and an output, the output of said second linear amplifier being the input to said third linear amplifier and being yet another said subsequent input to the third stage of said multistage logarithmic amplifier, the output of said third linear amplifier serving as yet another said subsequent input to a third stage of said multistage logarithmic amplifier.

* * * * *